United States Patent
Hu

(10) Patent No.: US 7,105,583 B2
(45) Date of Patent: *Sep. 12, 2006

(54) RADIATION-CURABLE COMPOSITIONS FOR OPTICAL FIBER COATING MATERIALS

(75) Inventor: Shengkui Hu, Baden, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 102 days.

This patent is subject to a terminal disclaimer.

(21) Appl. No.: 10/317,970

(22) Filed: Dec. 12, 2002

(65) Prior Publication Data

US 2003/0119934 A1 Jun. 26, 2003

Related U.S. Application Data

(63) Continuation-in-part of application No. 10/272,708, filed on Oct. 17, 2002, now abandoned.

(60) Provisional application No. 60/343,074, filed on Dec. 20, 2001.

(51) Int. Cl.
- C08F 2/46 (2006.01)
- C08F 26/02 (2006.01)
- C08G 71/04 (2006.01)
- C02J 3/28 (2006.01)
- G02B 6/44 (2006.01)

(52) U.S. Cl. .................. 522/90; 522/96; 525/454; 525/455; 525/458; 526/301; 524/850; 428/378; 428/406; 428/407; 385/114; 385/145

(58) Field of Classification Search .......... 525/454, 525/455, 458, 920; 526/201; 385/145
See application file for complete search history.

(56) References Cited

U.S. PATENT DOCUMENTS

| | | | |
|---|---|---|---|
| H304 H | 7/1987 | Vorrier et al. | 522/92 |
| 5,017,433 A | 5/1991 | Chevreux et al. | 428/425.6 |
| 5,426,166 A | 6/1995 | Usifer | 526/301 |
| 5,787,218 A | 7/1998 | Ohtaka | 385/123 |
| 5,881,194 A | 3/1999 | Duecker | 385/115 |
| 5,908,873 A | 6/1999 | Shustack | 522/39 |
| 5,933,559 A | 8/1999 | Petisce | 385/114 |
| 5,977,202 A | 11/1999 | Chawla | 522/172 |
| 5,998,497 A | 12/1999 | Ishikawa | 522/96 |
| 6,021,338 A * | 2/2000 | Zahora et al. | 505/230 |
| 6,023,547 A * | 2/2000 | Tortorello | 385/114 |
| 6,052,503 A | 4/2000 | Schouten | 385/114 |
| 6,107,361 A | 8/2000 | Tortorello et al. | 522/96 |
| 6,122,428 A | 9/2000 | Duecker | 385/115 |
| 6,187,835 B1 * | 2/2001 | Szum et al. | 522/96 |
| 6,240,230 B1 | 5/2001 | Szum | 385/100 |
| 6,265,476 B1 | 7/2001 | Krongauz | 524/262 |
| 6,316,516 B1 | 11/2001 | Chien | 522/91 |
| 6,319,603 B1 | 11/2001 | Komiya | 428/378 |
| 6,323,255 B1 | 11/2001 | Snowwhite | 522/120 |
| 6,359,025 B1 | 3/2002 | Snowwhite | 522/64 |
| 6,362,249 B1 | 3/2002 | Chawla | 522/182 |
| 6,376,571 B1 | 4/2002 | Chawla | 522/64 |
| 6,596,394 B1 | 7/2003 | Toler et al. | 428/392 |
| 6,596,787 B1 | 7/2003 | Levandoski et al. | 522/96 |
| 6,872,760 B1 * | 3/2005 | Hu et al. | 522/96 |
| 2001/0021727 A1 | 9/2001 | Szum | |
| 2001/0025062 A1 | 9/2001 | Szum et al. | |
| 2002/0057885 A1 | 5/2002 | Szum et al. | |
| 2002/0102077 A1 | 8/2002 | Szum et al. | |
| 2002/0161154 A1 | 10/2002 | Cattron et al. | |
| 2005/0161634 A1 * | 7/2005 | Szum et al. | 252/182.22 |

FOREIGN PATENT DOCUMENTS

| | | |
|---|---|---|
| EP | 0 168 173 | 1/1986 |
| EP | 0 740 210 | 10/1996 |
| EP | 0 874 012 | 10/1998 |
| EP | 1178064 | 6/2000 |

* cited by examiner

Primary Examiner—Randy Gulakowski
Assistant Examiner—John J. Figueroa
(74) Attorney, Agent, or Firm—Diane R. Myers; Donald R. Palladino

(57) ABSTRACT

Compositions for use in optical fiber coatings, optical fibers and optical fiber arrays using these coatings and methods for making the same are disclosed. The composition comprises a combination of two different radiation curable urethanes, and can further comprise one or more reactive monomers.

22 Claims, No Drawings

RADIATION-CURABLE COMPOSITIONS FOR OPTICAL FIBER COATING MATERIALS

This application claims priority to U.S. Provisional Application No. 60/343,074, filed Dec. 20, 2001 and is a continuation-in-part of U.S. patent application Ser. No. 10/272,708, filed Oct. 17, 2002 now abandoned.

FIELD OF THE INVENTION

The present invention relates to radiation-curable compositions useful as coatings for optical fibers. More specifically, these compositions comprise a unique combination of two different radiation curable urethane oligomers; one or more mono- or polyfunctional reactive monomers can also be included.

BACKGROUND OF THE INVENTION

Optical glass fibers have become integral to the telecommunications industry. While the fibers are exceptionally strong, they are easily flawed such as by exposure to environmental factors including dust and moisture. It is therefore desired to coat the fibers almost immediately after formation with one or more coating materials. In some cases these fibers have one coating material and in other cases two or more coatings may be used. For example, the fibers may be coated with a soft inner primary coating and a tougher secondary coating; the secondary coating typically provides a more durable exterior for the optical fiber. The outermost coating layer is often colored, such as by application of an ink layer or through addition of a colorant to the coating material itself. Color coding of the fibers allows for easier identification of the individual coated optical glass fibers. This is particularly relevant in industries where a plurality of fibers are aggregated into a cable. In such applications, the fibers are typically bonded together in a matrix material. For example, the matrix material can encase the optical fibers or can edge bond the optical fibers together.

It is generally desired that the matrix material used in optical fiber assemblies will provide both the desired level of "toughness" while still allowing for flexibility. The physical properties of the matrix components, such as the polymers, can be related to the performance of the matrix material. For example, a suitable matrix material will typically have a glass transition temperature ("Tg") high enough to allow acceptable heat strip for peelable optical fiber ribbon and to provide resistance to environmental attacks such as by moisture and/or chemicals. The matrix material should also have an elongation sufficient to render the ribbon robust in various handling operations, such as in heat strip operations. Since the matrix material will most typically be in direct contact with the outermost coating on the fibers, it is also desirable that the matrix material release from the fibers when necessary, such as when repairing or branching is needed. The ability to access individual fibers in a ribbon matrix without damaging the fiber or any coating or identification thereon is an important feature. The ability to release, however, must be countered against the ability to adhere to the fibers during use. The matrix material should also have high resistance to thermal, oxidative and hydrolytic degradation. The ability to cure rapidly, such as upon exposure to UV radiation, can also be an important feature. Thus, there are a number of desirable characteristics for a matrix material, and it is often the case with compositions known in the art that improvement of one characteristic results in the sacrifice of another.

SUMMARY OF THE INVENTION

The present invention provides a curable composition that finds particular application as an optical fiber coating material and is especially suitable as a matrix material. The composition comprises two different radiation curable urethane components. The first of these components imparts to the composition a high Tg, that is, a Tg equal to or greater than about 50° C. The second of these components imparts a high elongation to the composition, that is, an elongation equal to or greater than about 15 percent. The composition can further comprise one or more reactive monomers; these monomers can be monofunctional, polyfunctional or combinations thereof. Various additives can also be included, such as photoinitiators, thermal initiators, releasing agents, anti-oxidants, stabilizers, UV absorbers, adhesion promoters and the like.

The present compositions therefore combine the characteristics of high Tg and high elongation. These properties are particularly desirable in matrix and secondary fiber coatings. Other desired characteristics of optical fiber matrix materials and fiber coatings, such as good curing speed and high resistance to various environmental factors, are also provided by the present compositions.

The present invention is further directed to optical fiber ribbon arrays containing secondary coatings and/or matrices prepared from the present compositions, and to processes for preparing these arrays.

DETAILED DESCRIPTION OF THE INVENTION

The present invention is directed to a composition comprising a combination of two different radiation curable urethane components. A "radiation curable urethane component", as used herein, refers to a composition containing urethane linkages and having at least one functional group that can be cured by exposure to radiation. The first of these components generally imparts a high Tg to the compositions of the invention, while the second of these components generally imparts a high elongation to the present compositions. The present compositions can also include one or more mono- or poly-functional reactive monomers that can also influence the properties of the coating compositions. Additives standard in the art, such as photoinitiators, thermal initiators, releasing agents, anti-oxidants, UV absorbers, stabilizers and the like can also optionally be added.

The first component in the present compositions is a radiation curable urethane oligomer that imparts a high Tg to the present compositions. Generally, this can be any radiation curable oligomer that imparts a Tg to the final composition of equal to or greater than about 50° C.; particularly suitable are those that impart a Tg of equal to or greater than about 85° C. Whether a particular radiation curable urethane imparts a high Tg to a composition can be determined by one skilled in the art using standard methods. More specifically, the radiation curable urethane can be prepared and added into the present compositions as described below. The Tg of the composition can then be measured using a dynamic mechanical analyzer following methods standard in the art, such as those described in the examples below. As used herein, "Tg" is defined as the temperature at the peak of Tan δ during a dynamic thermomechanical test. It should be noted that "high Tg" refers to the Tg of the final composition and not the Tg of the radiation curable urethane itself.

The high Tg imparting radiation curable urethane can be formed by means standard in the art through the reaction of a polyhydric compound, a polyisocyanate, and a suitable endcapping monomer. More specifically, the high Tg imparting urethane component of the present compositions is the reaction product of an aliphatic or aromatic polyol, an aliphatic or aromatic polyisocyanate, and an endcapping monomer capable of supplying a reactive terminus.

Suitable polyols generally contain cyclic structures and include bisphenol A, bisphenol F, alkyleneoxide-addition diols to bisphenol-A, alkyleneoxide-addition diols to bisphenol-F, hydrogenated bisphenol-A, hydrogenated bisphenol-F, alkyleneoxide-addition diols of hydrogenated bisphenol-A, alkyleneoxide-addition diols of hydrogenated bisphenol-F, hydroquinone, alkyleneoxide-addition diols of hydroquinone, naphthohydroquinone, alkyleneoxide-addition diols of naphthohydroquinone, anthrahydroquinone, alkyleneoxide-addition diols of anthrahydroquinone, 1,4-cyclohexane dimethanol and its alkyleneoxide-addition diols, tricyclodecanediol, tricyclodecanedimethanol, pentacyclodecanediol, pentacyclodecanedimethanol. Bisphenol A alone or in conjunction with 1,4-cyclohexane dimethanol are particularly suitable. Other polyols can also be used in combination with the cyclic ring-containing polyols so long as the high Tg characteristics of the oligomer are not significantly lowered. These include polyether polyols, polycarbonate polyols, and other polyols without cyclic structures. Examples of polyether polyols include polyols obtained by ring-opening polymerization or copolymerization of at least one type of compound selected from ethylene oxide, propylene oxide, butylene oxide, tetrahydrofuran, 2-methyl-tetrahydrofuran, 3-methyltetrahydrofuran, oxetane, and substituted oxetane. Examples of polycarbonate polyols include 1,6-hexanedicarbonate, 1,9-nonanedipolycarbonate, 2-methyl-1,8-octanepolycarbonate, and mixtures thereof. Examples of other polyols without a cyclic structure include ethylene glycol, propylene glycol, 1,4-butanediol, 1,5-pentanediol, 1,6-hexanediol, neopentyl glycol, polymethyl-6-valerolactonepolyol, polybutadiene with a terminal hydroxy group, hydrogenated polybutadiene with a terminal hydroxy group, castor oil-modified polyols. The number average molecular weight ("Mn") of these polyols can be in the range of 50 to 1,000 Daltons such as in the 100 to 700 range. Particularly suitable polyol compounds are polytetramethylene glycols with a number average molecular weight between 200 and 700. Mixtures of polyols can also be used.

The polyisocyanate component can be either aromatic or aliphatic. Aliphatic polyisocyanates of from 4 to 20 carbon atoms may be employed. Suitable saturated aliphatic polyisocyanates include but are not limited to isophorone diisocyanate, methylenebis(4-cyclohexyl isocyanate), hydrogenated diphenylmethane diisocyanate, hydrogenated xylylene diisocyanate, 1,4-cyclohexyl diisocyanate, 1,3-cyclohexyl diisocyanate. Isophorone diisocyanate and methylenebis(4-cyclohexyl isocyanate) are particularly suitable. Suitable aromatic polyisocyanates include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, and mixtures thereof.

The high Tg imparting radiation curable urethane can have one or more cyclic ring structures per molecule, and in some embodiments will have three or more cyclic rings. "Cyclic ring" is used throughout the specification and claims to refer to both cycloaliphatic and aromatic structures, and includes mono- and polycyclic structures. In one embodiment, at least one of the three or more cyclic ring structures per molecule in the high Tg imparting oligomer is aromatic. In those embodiments where an aromatic ring is present, it can be introduced through the polyol, the polyisocyanate or both. It will be appreciated that when an aromatic polyol and/or polyisocyanate is used, the resulting radiation curable urethane is not wholly aliphatic.

The endcapping monomer may be one that is capable of providing at least one reactive terminus; the reactive terminus will typically include groups having ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

Acrylate or methacrylate termini are particularly suitable and include but are not limited to hydroxyalkyl(meth)acrylates such as hydroxyethyl(meth)acrylate, hydroxypropyl (meth)acrylate, hydroxybutyl(meth)acrylate, 2-hydroxy-3-phenyloxypropyl (meth)acrylate, 1,4-butanediol mono (meth)acrylate, 4-hydroxycyclohexyl (meth)acrylate, 1,6-hexanediol mono(meth)acrylate, neopentyl glycol mono (meth)acrylate, trimethylolpropane di(meth)acrylate, trimethylolethane di(meth)acrylate, pentaerythritol tri(meth) acrylate, dipentaerythritol penta(meth)acrylate, and the like. A particularly suitable endcapping monomer is hydroxyethyl(meth)acrylate. The convention of using "(meth)acrylate" to refer both to methacrylate and acrylate is well established and is used herein. It will be understood that while a (meth)acrylate can be used as an endcapping monomer, the oligomer does not have an acrylic backbone.

The molar ratio of the polyol, polyisocyanate and endcapping monomer used in preparing the high Tg imparting component is typically about 1:2-3:2-4. A particularly suitable ratio is 1:2.5:3.

A particularly suitable urethane acrylate that imparts high Tg to the present compositions can be formed from bisphenol A, methylene bis(4-cyclohexyl isocyanate), and hydroxyl ethylacrylate in a molar ratio of about 1:2.5:3.

The high Tg imparting urethane component is typically present in the compositions of the invention in amounts from 20 to 80 weight percent, such as from 30 to 70 weight percent, with weight percent being based on the total weight of the two radiation curable urethane components, or from 10 to 40 weight percent, with weight percent being based on the total weight of the composition.

The second component of the present composition is a radiation curable urethane that imparts high elongation to the present compositions. By "high elongation" is meant an elongation of equal to or greater than about 15 percent. An elongation of 35 to 65 percent is particularly desirable; the elongation will typically be less than 100 percent.

Whether a particular radiation curable urethane imparts a high elongation to a composition can be determined by one skilled in the art using standard methods. More specifically, the radiation curable urethane can be prepared and added into the present compositions, which can then be tested for elongation on an Instron according to ASTM D-882 using 5 mil films. It should be noted that "high elongation" refers to the elongation of the final composition and not the elongation of the radiation curable urethane itself.

The high elongation imparting component can be prepared by reacting a polyol, a polyisocyanate and an endcapping monomer, much like the high Tg component discussed above. The high elongation imparting component, however, will typically be based on a diol having an Mn of at least about 2000 Daltons. More specifically, this includes polyether polyols such as polyols obtained by ring-opening polymerization or copolymerization of at least one type of compound selected from ethylene oxide, propylene oxide, butylene oxide, tetrahydrofuran, 2-methyl-tetrahydrofuran, 3-methyl-tetrahydrofuran, oxetane, and substituted oxetane. Other suitable polyols include propylene glycol and polypropylene glycol. Mixtures of all of these polyols can also be used. Examples of desirable polyol compounds are polytetramethylene glycol with an Mn of at least 2000 Daltons. Particularly suitable polyols are polyTHF 2000 and polyTHF 2900 from BASF Corporation as well as TERATHANE 2000 and TERATHANE 2900 from DuPont. Other examples of desirable polyol compounds are polypropylene glycols with a number average molecular weight of at least 2000 such as PPG 2025 from Bayer or PLURACOL 4000 from BASF Corporation. Aromatic polyols such as those listed above can also be used here provided their Mn is at least 2000. Smaller polyols with more than two hydroxyl groups are also often used in addition to these relatively high molecular weight diols. Such polyols include 1,1,1-trimethylolpropane and its dimer, pentaerythritol and its dimer, glycerine and ribose with 1,1,1-trimethylolpropane being particularly suitable.

Many of the aliphatic and aromatic polyisocyanates listed above for the high Tg imparting component can also be used here. Tetramethylxylylene diisocyanate (TMXDI) is especially suitable. Additional suitable aliphatic polyisocyanates include 1,4-tetramethylene diisocyanate, 1,5-pentamethylene diisocyanate, 1,6-hexamethylene diisocyanate, 1,7-heptamethylene diisocyanate, 1,8-octamethylene diisocyanate, 1,9-nonamethylene diisocyanate, 1,10-decamethylene diisocyanate, and mixtures thereof. It will be appreciated that many of the aliphatic isocyanates listed here are more suited to the high elongation imparting component but not the high Tg imparting component; that is because these isocyanates are very flexible and give low Tg materials.

The endcapping monomer is also described above for the high Tg imparting component; hydroxy alkyl acrylates are again particularly suitable.

The molar ratio of polyol, polyisocyanate and endcapping monomer used in preparing the high elongation imparting component is 0.8-3.0:1.0-4.0:1; a particularly suitable ratio is 1.0-2.2:1.5-3.0:1.

A particularly suitable high elongation imparting component combines polytetramethylene glycol having an Mn of 2000 with trimethylolpropane, TMXDI, and hydroxyethyl acrylate in a molar ratio of 2.1:2.8:1. TERATHANE 2000 is a polytetramethylene glycol having an Mn of 2000. It will be appreciated that this molecule contains aromaticity and is therefore not wholly aliphatic. In one embodiment, both the high Tg and high elongation imparting components have aromatic moieties and thus neither are wholly aliphatic.

The high elongation imparting radiation curable urethane is typically present in the compositions of the invention in an amount from about 20 to 70 weight percent, such as from 30 to 60 weight percent, with weight percent being based on the total weight of the urethane components, or from 10 to 40 weight percent, with weight percent being based on the total weight of the composition. In one embodiment, the amount of high elongation imparting component is less than 30 weight percent and in another embodiment is less than 20 weight percent of the total weight of the composition. The ratio of high Tg imparting radiation curable urethane to high elongation imparting radiation curable urethane typically ranges from about 1:3 to about 3:1.

In one embodiment, neither of the radiation curable urethane contain isocyanurates. In another they contain no silicone modified moieties, aliphatic diisocyanate residues or propoxylated acrylates, and in yet another neither of the oligomers has the structure described as the second oligomer of U.S. Pat. No. 5,837,750, which is hereby incorporated by reference.

Both of the radiation curable urethane components of the present compositions can be prepared using methods standard in the art. There are generally two protocols for making the radiation curable urethane oligomers described herein. One protocol involves reacting the isocyanate component with the polyol first and then reacting the resulting product with the endcapping monomer. It is particularly suitable to synthesize the high Tg imparting oligomer using this protocol. The other protocol involves reacting the isocyanate component with the endcapping monomer followed by reaction with the polyol. It is particularly suitable to prepare the high elongation imparting oligomer using this protocol. Suitable catalysts can be used to increase the reaction rate between the hydroxyl group and the polyisocyanate; such catalysts are known in the art and include, for example, dibutyltindilaurate, dibutyltinoxide, dibutyl tin di-2-hexoate, stannous oleate, stannous octoate, lead, octoate, ferrous acetoacetate, and amines such as triethyleneamine, diethylmethylamine, triethylenediamine, dimethylethylamine, morpholine, N-ethyl morpholine, piperazine, N,N-dimethyl benzylamine, N,N-dimethyl lauralamine and mixtures thereof.

It will be appreciated that the high elongation imparting radiation curable urethane component imparts elongation properties to the present compositions. It is therefore possible to achieve a composition having suitable elongation without the use of various thiol elongation promoters, such as the mercapto or sulfide elongation promoters described in U.S. Pat. No. 6,265,476.

When there are three or more cyclic rings in 20 to 85 weight percent of the radiation curable urethane components, and there is also a polymerizable mono-functional vinyl monomer having a Tg greater than about 50° C., the urethane bonds are present in the composition at a concentration of less than $2.0 \times 10^{-3}$ mol per gram.

The present compositions can further comprise one or more mono or polyfunctional reactive monomers. These monomers can perform numerous functions in the present compositions; for example, the reactive monomer(s) can be used to adjust the viscosity of the coating compositions or to increase the crosslinking density of the compositions. The monomers are reactive, which means they contain at least one functional group capable of polymerization under radiation curable conditions.

The monomers can be mono-, or polyfunctional. A particularly suitable combination is one in which two monofunctional monomers are combined with one polyfunctional monomer, such as a tri- or tetra-functional mix. A particularly suitable combination within this embodiment is one that includes isobornyl acrylate, N-vinylpyrrolidone ("NVP") and pentaerythritol triacrylate. In this combination, the isobornyl acrylate can be added to the composition to lower the viscosity and contribute to Tg; NVP can be added to contribute to the high Tg, a fast cure, and the reduced viscosity of the composition; and pentaerythritol triacrylate can be added to improve the equilibrium modulus by increasing the crosslinking density. Suitable monomers may be straight or branched chain alkyl, cyclic or partially aromatic monomers, and can comprise, for example, a monomer or monomers having an acrylate or vinyl ether functionality and a $C_4$–$C_{20}$ alkyl or polyether moiety. Examples of such reactive monomers include hexylacrylate, 2-ethylhexylacrylate, isobornylacrylate, decylacrylate, laurylacrylate, stearylacrylate, ethoxyethoxy-ethylacrylate, laurylvinylether, 2-ethylhexylvinyl ether, N-vinyl formamide, isodecyl acrylate, isooctyl acrylate, vinylcaprolactam, N-vinylpyrrolidone, acrylamide, nonylphenol acrylate and the like. In one embodiment, none of the monomers are trans-esterified.

Another suitable type of reactive monomer is a compound comprising an aromatic group. Examples include, but are not limited to, ethyleneglycolphenyletheracrylate, polyethyleneglycolphenyletheracrylate, polypropyleneglycolphenyletheracrylate, phenoxyethylacrylate, and alkyl-substituted phenyl derivatives of the above monomers, such as polyethyleneglycolnonylphenyletheracrylate.

Further examples of suitable monomers include $C_2$–$C_{18}$ hydrocarbondioldiacrylates, $C_4$–$C_{18}$ hydrocarbondivinylethers, $C_3$–$C_{18}$ hydrocarbontrioltriacrylates, the polyether analogs thereof, and the like, such as 1,6-hexanedioldiacrylate, trimethylolpropanetriacrylate, hexanedioldivinylether, triethyleneglycol diacrylate, and alkoxylated bisphenol A diacrylate. Typically, the reactive monomers will be added in an amount ranging between about 25 and 75 weight percent of the total composition, such as 30 and 65 weight percent. If more than one reactive monomer is present, the amounts of monomers are added together to determine the amount of this component in the present compositions. One embodiment of the present invention specifically excludes compositions wherein one of the monomers is that taught in U.S. Pat. No. 5,998,497 when a polyether urethane acrylate and photoinitiator are also present; also, the monomers used in the present composition do not have to be specially purified as in U.S. Pat. No. 6,323,255. These two patents are incorporated by reference herein.

It is a feature of the present invention that the compositions disclosed herein can be cured by free radical cure. Those skilled in the art will understand that free radical cure includes the steps of initiation, propagation, chain transfer and termination. When cationic curable functional groups are included in the composition, they can also be cured by cationic polymerization processes. Cure can be prevoked by the use of actinic light, electron beam or heat depending on the application requirements; suitable initiators may also be included to effect initiation.

When radiation cure is desired, the present compositions may further comprise at least one photoinitiator. Conventional photoinitiators can be used, including benzophenones, acetophenone derivatives, such as alpha-hydroxyalkylphenylketones, benzoin alkyl ethers and benzyl ketals, monoacylphosphine oxides, and bisacylphosphine oxides. The conventional photoactive onium salts can be used to effect cationic cure. Particularly suitable free radical photoinitiators are combinations of an acetophenone derivative and a bisacylphosphine oxide, although in one embodiment, the bisacrylphosphine oxides described in U.S. Pat. No. 6,359,025 are specifically excluded.

When the liquid curable resin composition of the present invention is to be heat cured, a thermal polymerization initiator such as a peroxide or an azo compound can be used. Specific examples include benzoyl peroxide, t-butyl oxybenzoate and azobisisobutyronitrile.

The amount of photoinitiator or thermal inhibitor in the present compositions will typically range between about 0 and 15 weight percent, such as about 1 to 8 weight percent, with weight percent being based on the total weight of the composition.

The present compositions can also optionally comprise additives standardly known in the art. These additives typically comprise less than about 15 weight percent of the present compositions. For example, a release agent can be added. Examples include γ-aminopropyl triethoxysilane, γ-mercaptopropyl trimethoxysilane, and polydimethylsiloxane derivatives. Particularly suitable is γ-mercaptopropyl trimethoxysilane. Typically, the release agent or agents will be present in an amount of between about 2 and 3 weight percent. In one embodiment, a portion of the release agent is particulate, and would be in particulate form even after the present compositions are cured.

To improve shelf life or storage stability of the composition prior to cure, as well as to increase thermal and oxidative stability of the cured compositions, one or more stabilizers or anti-oxidants can be included in the composition.

Examples of suitable stabilizers include tertiary amines such as diethylethanolamine and trihexylamine; hindered amines; organic phosphites; hindered phenols; mixtures thereof; and the like. Some particular examples of antioxidants that can be used include propionates such as octadecyl-3-(3',5'-di-tert-butyl-4'-hydroxyphenyl)propionate and hydrocinnamates such as thiodiethylene bis(3,5-di-tert-butyl-4-hydroxy)hydrocinnamate and tetrakis[methylene(3,5-di-tert-butyl-4-hydroxyhydrocinnamate)]methane. Suitable commercially available antioxidants include IRGANOX 1010, 1035, 1076, and 1222, manufactured by Ciba Geigy.

UV absorption agents can also be included including those commercially available from Ciba Geigy as TINUVIN P234, 320, 326, 327, 328, 329, and 213.

Still other additives or components that may appear in the final coating include pigments, lubricants, wetting agents, adhesion promoters and leveling agents. These additives may be present in an effective amount that is usual for the additive when used in optical fiber coatings or protective materials. The person skilled in the art can determine the additives and amounts that are appropriate for a given use.

The viscosity of the coating composition will typically be between about 1000 and 10,000 centipoise (cps) as measured using a Brookfield viscometer No. 34 spindle at 6 rpm and 25° C.; a viscosity of between 5000 and 8000 cps is particularly suitable for optical ribbon matrix and secondary coating applications. Viscosity can be adjusted by any means known in the art.

The present compositions can be made using techniques and methods that are standard in the art.

In addition to high Tg and high elongation, the compositions of the present invention have numerous additional characteristics that render them suitable for use as optical ribbon coating materials. For example, the present compositions will typically have an equilibrium modulus after cure of greater than about 1 MPa and as high as 13 MPa or more. Equilibrium modulus can be measured using a dynamic mechanical analyzer.

The Youngs modulus of the present compositions, when cured, is typically greater than about 400 MPa and is typically between 500 and 700 MPa. Youngs modulus is also derived from dynamic mechanical analysis.

The Secant modulus of the present compositions, when cured, is typically greater than about 300 MPa and is typically between 300 and 500 MPa. Secant modulus is measured using an Instron according to ASTM D-882.

The Tensile stress at break of the present compositions, when cured, is typically greater than about 22 MPa and is typically between 25 and 31 MPa. Tensile stress is measured at 25° C. using an Instron according to ASTM D-882.

One embodiment of the present invention includes compositions that specifically exclude unsaturated substituted siloxane adhesion promoters and/or the adhesion promoters described in U.S. Pat. Nos. 5,977,202; 6,316,516; and 6,355,751, all of which are incorporated by reference herein. In other embodiments, the present compositions do not include a phospholipid, nor do they include a chromaphoric indicator.

The present invention is further directed to an optical fiber-bonded ribbon array wherein one or more of the coatings are of the present invention and method for making such an array. The array generally comprises a plurality of optical fibers that are coated with any coatings standardly used in the art for this purpose, such as those that are radiation cured. Any standard optical fiber can be used according to the invention, such as those having a glass core and a glass cladding layer. For example, the core may comprise silica doped with oxides of germanium or phosphorus and the cladding can be a pure or doped silicate, such as a fluorosilicate. The fibers may alternatively comprise a polymer clad silica glass core, such as an organosiloxane polymer cladding. The coated fibers are then secured in the desired configuration, such as in a parallel and planar or other prescribed arrangement, and are embedded in the composition of the present invention. For example, the fibers can be arranged in the desired manner; the liquid matrix can be applied to the fibers; and the matrix composition can be cured. The matrix composition, when cured, adheres to the fibers during use, but can be stripped therefrom without substantially damaging the integrity of the coated optical fibers, including any ink layer that has been deposited thereon. Specific embodiments include those wherein the second coating layer on the fiber is comprised of the composition of the present invention, the matrix coating layer, or both are comprised of the composition of the present invention. When both the secondary and matrix coatings are within the present invention, they can be the same or different embodiments.

As used herein, unless otherwise expressly specified all numbers such as those expressing values, ranges, amounts or percentages may be read as if prefaced by the word "about", even if the term does not expressly appear. Any numerical range recited herein is intended to include all sub-ranges subsumed therein. Also, as used herein, the term "polymer" is meant to refer to oligomers and both homopolymers and copolymers. The prefix "poly" as used herein refers to two or more.

EXAMPLES

The following examples are intended to illustrate the invention, and should not be construed as limiting the invention in any way. "Parts" refers to parts by weight.

Example 1

Preparation of High Tg Imparting Oligomer (1)

Into a two-liter, four-necked reaction kettle equipped with a thermometer, a mechanical stirrer and a condenser were charged 660.0 parts of methylene-bis-(4-cyclohexyl diisocyanate) and a 0.5 parts of dibutyltindilaurate. After the mixture was heated to 60° C., 64.6 parts of polytetramethylene glycol with a number average molecular weight of 650 (PolyTHF650, BASF Corporation), 205.2 parts of bisphenol A, 427.0 parts of isobornyl acrylate, 1.4 parts of 2,6-di-t-butyl-4-methylphenol and 0.2 parts of phenothiazine were added while maintaining the reaction temperature at 80° C. or below. The mixture was held at 80° C. for two hours. A sample was taken for isocyanate ("NCO") equivalent weight measurement to confirm the completeness of the reaction. Thereafter, 348.0 parts of hydroxyethyl acrylate and 0.5 parts of dibutyltindilaurate were added to the reactor while controlling the temperature at around 80° C. The mixture was held at 80° C. until it was significantly free of isocyanate functionality as revealed by NCO equivalent weight measurements. The NCO equivalent weight measurements were performed, which were accomplished by reacting any residual NCO functionality with an excess amount dibutylamine. The amount of amine consumed (if any) can be then calculated from titrating the amine with a standard acidic solution.

Preparation of High Elongation Imparting Oligomer (2)

Into a two-liter, four-necked reaction kettle equipped with a thermometer, a mechanical stirrer, and a condenser were charged 177.1 parts of meta-tetramethylenexylyl diisocyanate, 223.5 parts of isobornyl acrylate, 0.5 parts of dibutyltindilaurate, 1.4 parts of 2,6-di-t-butyl-4-methylphenol and 0.2 parts of phenothiazine. The mixture was heated to 35° C. and 46.4 parts of hydroxyethyl acrylate were added to the reactor. Cooling was applied to the reactor during the addition as necessary to maintain the reaction temperature below 40° C. The mixture was then held at 38° C. for two hours. A sample was taken for NCO equivalent weight measurement to confirm the completeness of the reaction. Thereafter, 1040.0 parts of polytetramethylene glycol with a number average molecular weight of 2000 (PolyTHF2000, BASF Corporation) and 0.5 parts of dibutyltindilaurate were added to the reactor while controlling the temperature at around 65° C. The mixture was then held at 65° C. until it was significantly free of isocyanate functionality as revealed by NCO equivalent weight measurements.

Formulation

Into a five liter, four-necked reaction kettle equipped with a thermometer, a mechanical stirrer, and a condenser were charged 563.36 parts of pentaerythritol triacrylate (Sartomer), 501.32 parts of isobornyl acrylate (Sartomer), 870.75 parts of oligomer (1) as synthesized above, and 792.28 parts of oligomer (2) as synthesized above. The mixture was heated to 66° C. and 31.95 parts of IRGANOX 1035 (Ciba Additives) were added. The mixture was stirred at 66° C. until it became clear; 95.78 parts of A189 (γ-mercaptopropyltrimethoxysilane, OSI Specialties), 242.23 parts of DAROCUR 4265 (Ciba Additives), 7.99 parts of SILWET L7602 (OSI Specialties), and 30.35 parts of BYK 371 (BYK-Chemie) were then added. Afterwards, the mixture was stirred at 66° C. for 30 minutes. The formulation had a viscosity of 7805 cps when measured with a Brookfield viscometer at 25° C.

A five mil coating of this composition was applied to a flat of glass plate using a Bird applicator and cured at 1 J/cm² under a D-lamp in a nitrogen atmosphere. The resulting free film gave a tensile stress at break of 27 MPa and an elongation of 41 percent when tested according to ASTM D-882. Dynamic mechanical analysis carried out at a frequency of 1 Hz, speed of 2° C. per minute from −50° C. to 180° C. on the free film gave a Tg of 79° C. and an equilibrium modulus of 13 MPa.

Example 2

Preparation of High Tg Imparting Oligomer (3)

Into a two-liter, four-necked reaction kettle equipped with a thermometer, a mechanical stirrer and a condenser were charged 672.6 parts of methylene-bis-(4-cyclohexyl diisocyanate) and 0.5 parts of dibutyltindilaurate. After the mixture was heated to 60° C., 65.8 parts of PolyTHF650, 165.5 parts of bisphenol A, 27.5 parts of cyclohexanedimethanol, 327.4 parts of isobornyl acrylate, 1.4 parts of 2,6-di-t-butyl-4-methylphenol and 0.2 parts of phenotriazine were added while maintaining the reaction temperature at 80° C. or below. The mixture was held at 80° C. for two hours. A sample was taken for isocyanate equivalent weight measurement to confirm the completeness of the reaction. Thereafter, 348.0 parts of hydroxyethyl acrylate and 0.5 parts of dibutyltindilaurate were added to the reactor while controlling the temperature to around 80° C. The mixture was held at 80° C. until it was significantly free of isocyanate functionality as revealed by NCO equivalent weight measurements.

Preparation of High Elongation Imparting Oligomer (4)

Into a two-liter, four-necked reaction kettle equipped with a thermometer, a mechanical stirrer and a condenser were charged 190.4 parts of meta-tetramethylene diisocyanate, 327.6 parts of isobornyl acrylate, 9.6 parts of trimethylolpropane, 0.5 parts of dibutyltindilaurate, 1.4 parts of 2,6-di-t-butyl-4-methylphenol and 0.2 parts of phenothiazine. The mixture was heated up and held at 80° C. until the NCO equivalent weight was within the theoretical value. The mixture was then cooled to 35° C. and 32.4 parts of hydroxyethyl acrylate was added to the reactor. Cooling was applied to the reactor during the addition as necessary to control the reaction temperature to below 40° C. The mixture was then held at 38° C. for two hours. A sample was taken for isocyanate equivalent weight measurement to confirm the completeness of the reaction. Thereafter, 1053.4 parts of PolyTHF2000 and 0.5 parts of dibutyltindilaurate were added to the reactor while controlling the temperature to around 65° C. The mixture was then held at 65° C. until it was significantly free of isocyanate functionality as revealed by NCO equivalent weight measurements.

Formulation

Into a three liter, four-necked reaction kettle equipped with a thermometer, a mechanical stirrer, and a condenser were charged 673.60 parts of N-vinyl-2-pyrrolidone (ISP), 261.80 parts of dipentaerythritol pentoacrylate (Sartomer), 1052.70 parts of oligomer (3) as synthesized above, and 897.30 parts of oligomer (4) as synthesized above. The mixture was heated to 66° C. and 29.30 parts of IRGANOX 1035 (Ciba Additives) were added. The mixture was stirred at 66° C. until it became clear; 114.5 parts of DAROCUR 4265 (Ciba Additives), 7.58 parts of SILWET L7602 (OSI Specialties), and 29.30 parts of BYK 371 (BYK-Chemie) were then added. Afterwards, the mixture was stirred at 66° C. for 30 minutes. The formulation had a viscosity of 4400 cps when measured with a Brookfield viscometer at 25° C.

A five mil coating of this composition was applied to a flat of glass plate using a Bird applicator and cured at 1 J/cm² under a D-lamp in a nitrogen atmosphere. The resulting free film gave a tensile stress at break of 37 MPa and an elongation of 50 percent when tested according to ASTM D-882. Dynamic mechanical analysis carried out at a frequency of 1 Hz, speed of 2° C. per minute from −50° C. to 180° C. on the free film gave a Tg of 120° C. and an equilibrium modulus of 13 MPa.

Whereas particular embodiments of this invention have been described above for purposes of illustration, it will be evident to those skilled in the art that numerous variations of the details of the present invention may be made without departing from the invention as defined in the appended claims.

What is claimed is:

1. A composition comprising:
   a. a first radiation curable urethane that imparts a high Tg to the composition; and
   b. a second radiation curable urethane that imparts a high elongation to the composition;
   wherein said first and second radiation curable urethanes are different,
   wherein said composition has a Tg≧50° C., an elongation≧15 percent, and wherein the second radiation curable urethane is formed from a combination of polytetramethylene glycol, trimethylolpropane and a diisocyanate.

2. The composition of claim 1, wherein said Tg is ≧85° C.

3. The composition of claim 1, wherein said elongation is ≧35 percent.

4. The composition of claim 1, wherein said first radiation curable urethane has one or more cyclic ring structures per molecule.

5. The composition of claim 4, wherein said first radiation curable urethane has three or more cyclic ring structures per molecule.

6. The composition of claim 1, wherein said second urethane component comprises the reaction product of tetramethylxylene diisocyanate, a polyol having an Mn of greater than 2000 Daltons, and at least one hydroxyl functional radiation curable compound.

7. The composition of claim 1, further comprising one or more reactive monomers.

8. The composition of claim 7, wherein at least one of the reactive monomers is N-vinylpyrrolidone.

9. The composition of claim 7, wherein at least one of the reactive monomers is monofunctional.

10. The composition of claim 7, wherein the reactive monomers comprise isobornyl acrylate, N-vinylpyrrolidone and pentaerythritol triacrylate.

11. The composition of claim 1, wherein the radiation curable moieties of the first radiation curable urethane, the second radiation curable urethane, or both, are not derived from an acrylate or methacrylate group.

12. A glass fiber coated with the composition of claim 1.

13. An optical fiber ribbon array containing a plurality of glass fibers bonded together in a matrix material, wherein the matrix material is a cured composition of claim 1.

14. The array of claim 13, wherein one or more of the glass fibers are also coated with a composition comprising:
   a. a first radiation curable urethane; and
   b. a second radiation curable urethane;
wherein said first and second radiation curable urethanes are different and wherein said composition has a Tg≧50° C. and an elongation≧15 percent.

15. The composition of claim 1, wherein the first radiation curable urethane is a urethane (meth)acrylate and the second radiation curable urethane is a urethane (meth)acrylate.

16. A composition comprising:
   a. a first radiation curable urethane; and
   b. a second radiation curable urethane;
wherein said first and second radiation curable urethanes are different and wherein said composition has a Tg≧50° C. and an elongation≧15 percent; and wherein said first radiation curable urethane comprises the reaction product of methylene bis(4-cyclohexyl isocyanate), bisphenol A and at least one hydroxyl functional radiation curable compound.

17. An optical fiber ribbon array containing a plurality of glass fibers bonded together in a matrix material, wherein the matrix material is a cured composition of claim 16.

18. The array of claim 17, wherein one or more of the glass fibers are also coated with a composition comprising:
   a. a first radiation curable urethane; and
   b. a second radiation curable urethane;
wherein said first and second radiation curable urethanes are different and wherein said composition has a Tg≧50° C. and an elongation≧15 percent.

19. A composition comprising:
   a. a first urethane (meth)acrylate; and
   b. a second urethane (meth)acrylate;
wherein said first and second urethane (meth)acrylates are different and wherein said composition has a Tg≧50° C. and an elongation≧15 percent; and wherein said first urethane (meth)acrylate comprises the reaction product of methylene bis(4-cyclohexyl isocyanate), bisphenol A and hydroxyethylacrylate.

20. The composition of claim 19, wherein the bisphenol A is used in conjunction with one or more additional polyols.

21. An optical fiber ribbon array containing a plurality of glass fibers bonded together in a matrix material, wherein the matrix material is a cured composition of claim 19.

22. The array of claim 21, wherein one or more of the glass fibers are also coated with a composition comprising:
   a. a first urethane (meth)acrylate; and
   b. a second urethane (meth)acrylate;
wherein said first and second urethane (meth)acrylates are different and wherein said composition has a Tg≧50° C. and an elongation≧15 percent.

* * * * *